United States Patent
Sutra Cole et al.

(10) Patent No.: US 8,968,493 B2
(45) Date of Patent: Mar. 3, 2015

(54) GAS GENERATOR CASE REPAIR

(75) Inventors: Daniel Sutra Cole, Longueuil (CA); Guy Beaulieu, Saints-Julie (CA)

(73) Assignee: Pratt & Whitney Canada Corp., Longueuil, Quebec ( * ) Notice: Subject to any disclaimer, the term of this patent is extended or adjusted under 35 U.S.C. 154(b) by 349 days.

(21) Appl. No.: 13/606,608

(22) Filed: Sep. 7, 2012

(65) Prior Publication Data

US 2014/0069523 A1     Mar. 13, 2014

(51) Int. Cl.
*C21D 9/08*     (2006.01)
*B23P 6/00*     (2006.01)

(52) U.S. Cl.
USPC ...................................... 148/521; 29/888.011

(58) Field of Classification Search
CPC .................................... C21D 9/50; B23P 6/02
USPC ....................... 148/521; 137/343; 29/888.011
See application file for complete search history.

(56) References Cited

U.S. PATENT DOCUMENTS

| 5,249,727 A | 10/1993 | Eberle et al. |
| 5,624,134 A | 4/1997 | Iwai et al. |
| 7,955,446 B2 | 6/2011 | Dierberger |
| 7,988,799 B2 | 8/2011 | Dierberger |
| 2010/0181366 A1 | 7/2010 | Anantharaman |

FOREIGN PATENT DOCUMENTS

GB     2286142     9/1995

*Primary Examiner* — Jessee Roe
(74) *Attorney, Agent, or Firm* — Norton Rose Fulbright Canada

(57) ABSTRACT

A method of reforming an annular attachment flange of an outer annular portion of a gas generator case, including inserting a first fixture element within the annular portion, the first fixture element conforming to an inner surface of the flange and forcing the flange radially outwardly passed a desired orientation, pressing the attachment flange against the first fixture element with a second annular fixture element surrounding the flange and conforming to an outer surface of the flange, heating the outer portion pressed by the fixture elements to a temperature and time period corresponding to an annealing of the material of the outer portion, forcing cooling of the outer portion, and disengaging the cooled outer portion from the fixture elements so that the released flange extends at the desired orientation. A gas generator case including a reformed outer portion and an unused inner portion is also discussed.

18 Claims, 5 Drawing Sheets

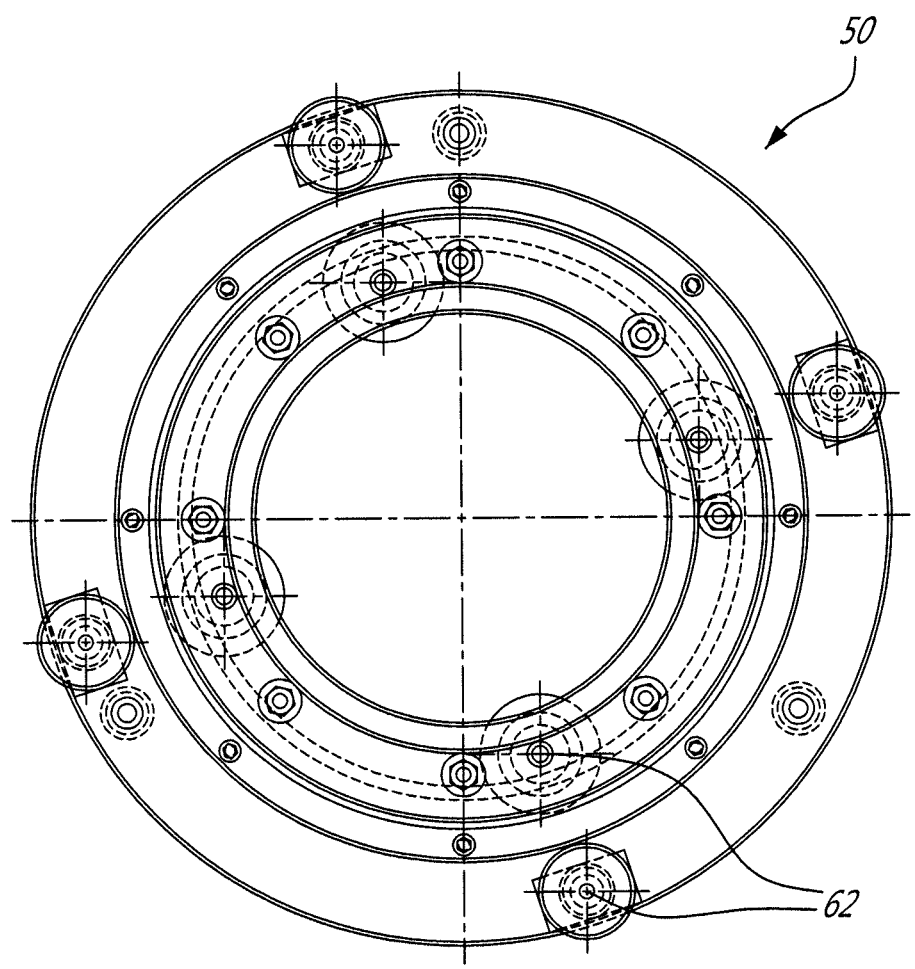

GAS GENERATOR CASE REPAIR

TECHNICAL FIELD

The application relates generally to gas turbine engines and, more particularly, to the repair of a gas generator case in such engines.

BACKGROUND OF THE ART

Gas turbine engines generally include a gas generator case surrounding the combustor. Some gas generator cases include an internal portion defining a diffuser through which fluid flow communication is provided between the compressor section and the combustor and/or a bearing housing for receiving a bearing supporting a main shaft. When damage occurs to the internal portion, the case is usually replaced in order to keep the relative position of the elements of the case within relatively tight tolerances.

SUMMARY

In one aspect, there is provided a method of repairing a gas generator case of a gas turbine engine, the case having an outer annular portion surrounding a damaged inner portion and having an annular flange at one end thereof defining a sole connection between the outer and inner portions, the annular flange extending at a first acute angle from an axial direction of the case, the method comprising: cutting between the annular flange and the inner portion along a circular path concentric with the flange; removing the damaged inner portion; clamping the outer portion in a fixture having an outer element conforming to an outer surface of the annular flange and an inner element conforming to an inner surface of the annular flange and pressing against the outer element, the fixture forcing the annular flange to a second acute angle from the axial direction smaller than the first angle, the fixture being made of a same material as that of the outer portion; heating the clamped outer portion to a temperature and time period corresponding to an annealing of the material of the outer portion; forcing cooling of the outer portion; removing the cooled outer portion from the fixture; and inserting a new inner portion within the outer portion and attaching the new inner portion to the flange.

In another aspect, there is provided a method of reforming an annular attachment flange at an extremity of an outer annular portion of a gas generator case of a gas turbine engine to a desired orientation for attachment to a remainder of the gas generator case, the method comprising: inserting a first fixture element within the annular portion made of a same material as that of the flange, the first fixture element conforming to an inner surface of the flange and forcing the flange radially outwardly passed the desired orientation; pressing the attachment flange against the first fixture element with a second annular fixture element made of a same material as that of the flange, surrounding the flange and conforming to an outer surface of the flange; heating the outer portion pressed by the fixture elements to a temperature and time period corresponding to an annealing of the material of the outer portion; forcing cooling of the outer portion; and disengaging the cooled outer portion from the fixture elements so that the released flange extends at the desired orientation.

In a further aspect, there is provided a gas generator case comprising an outer portion reformed following the above method, the outer portion surrounding and being concentric to an inner portion defining a diffuser at an upstream end thereof, a bearing housing connected to the diffuser and located radially inwardly thereof and concentrically thereto, and an annular attachment flange extending downstream from the upstream end and located radially outwardly of and concentrically to the diffuser, the inner portion being in a unused state, the attachment flanges of the inner and outer portions being interconnected.

DESCRIPTION OF THE DRAWINGS

Reference is now made to the accompanying figures in which:

FIG. 6 is a top view of the fixture of FIG. 5.

DETAILED DESCRIPTION

Figure 1:
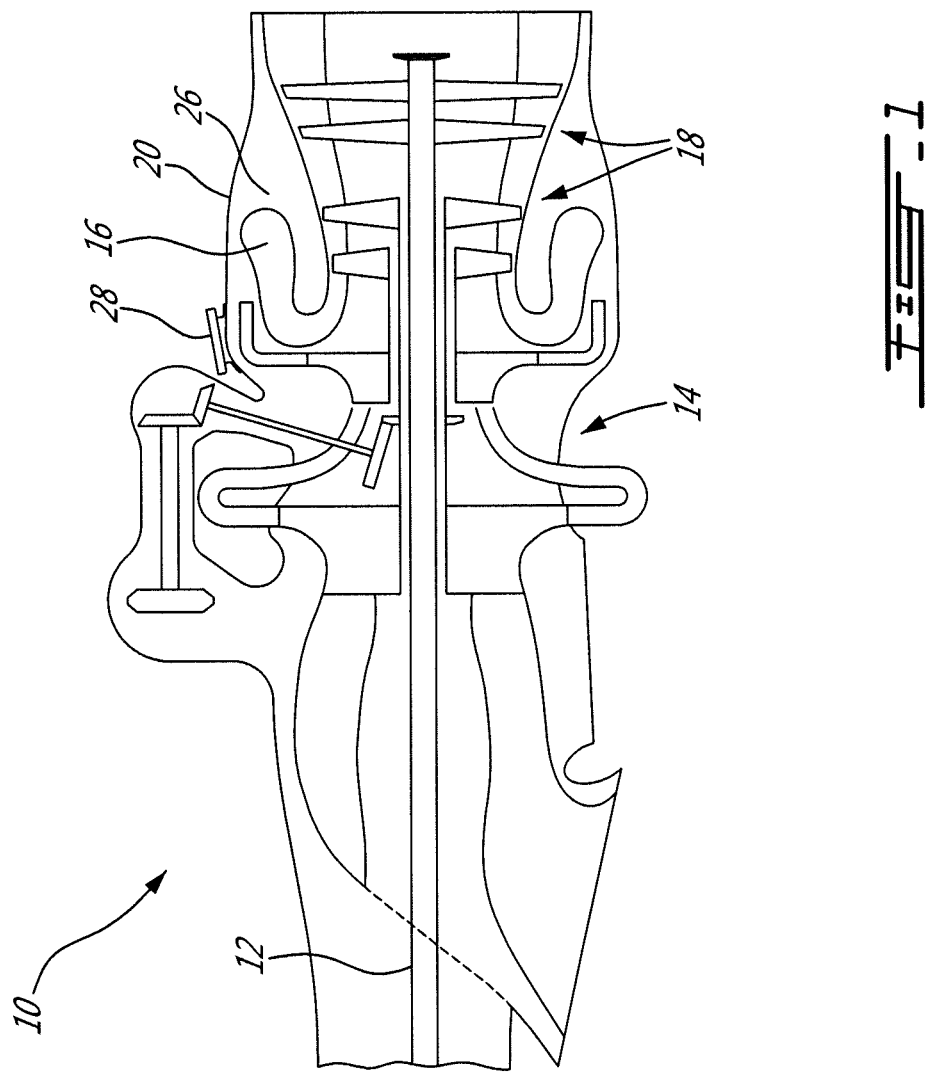
FIG. 1 is a schematic cross-sectional view of a gas turbine engine.

FIG. 1 illustrates a gas turbine engine 10 of a type preferably provided for use in subsonic flight, generally comprising in serial flow communication a compressor section 14 for pressurizing the air, a combustor 16 in which the compressed air is mixed with fuel and ignited for generating an annular stream of hot combustion gases, and a turbine section 18 for extracting energy from the combustion gases and for rotating a drive shaft 12 which rotates a propeller through an appropriate reduction gearbox (not shown). Although the engine 10 is illustrated here as a turboprop engine, alternately the engine may be of another type, for example a turboshaft or a turbofan.

Figure 2:
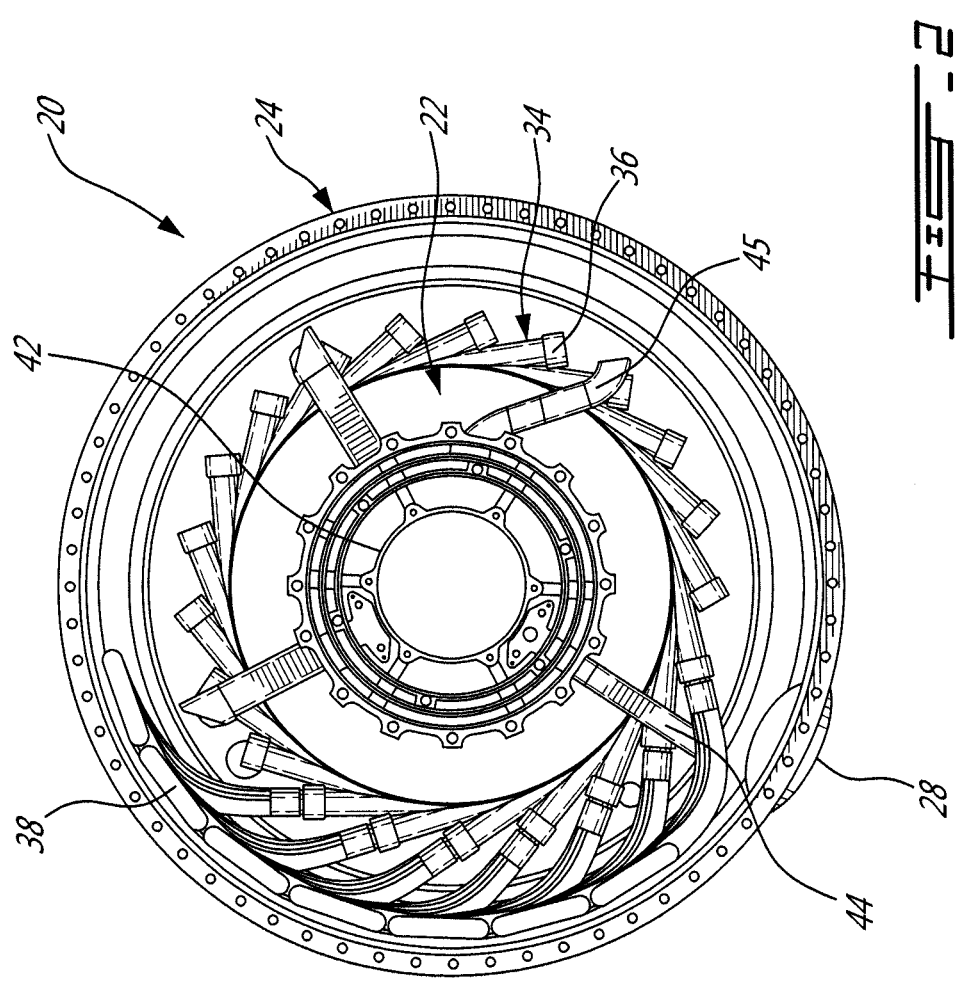
FIG. 2 is a schematic rear view of a gas generator case which can be used in a gas turbine engine such as shown in FIG. 1.
Figure 3:
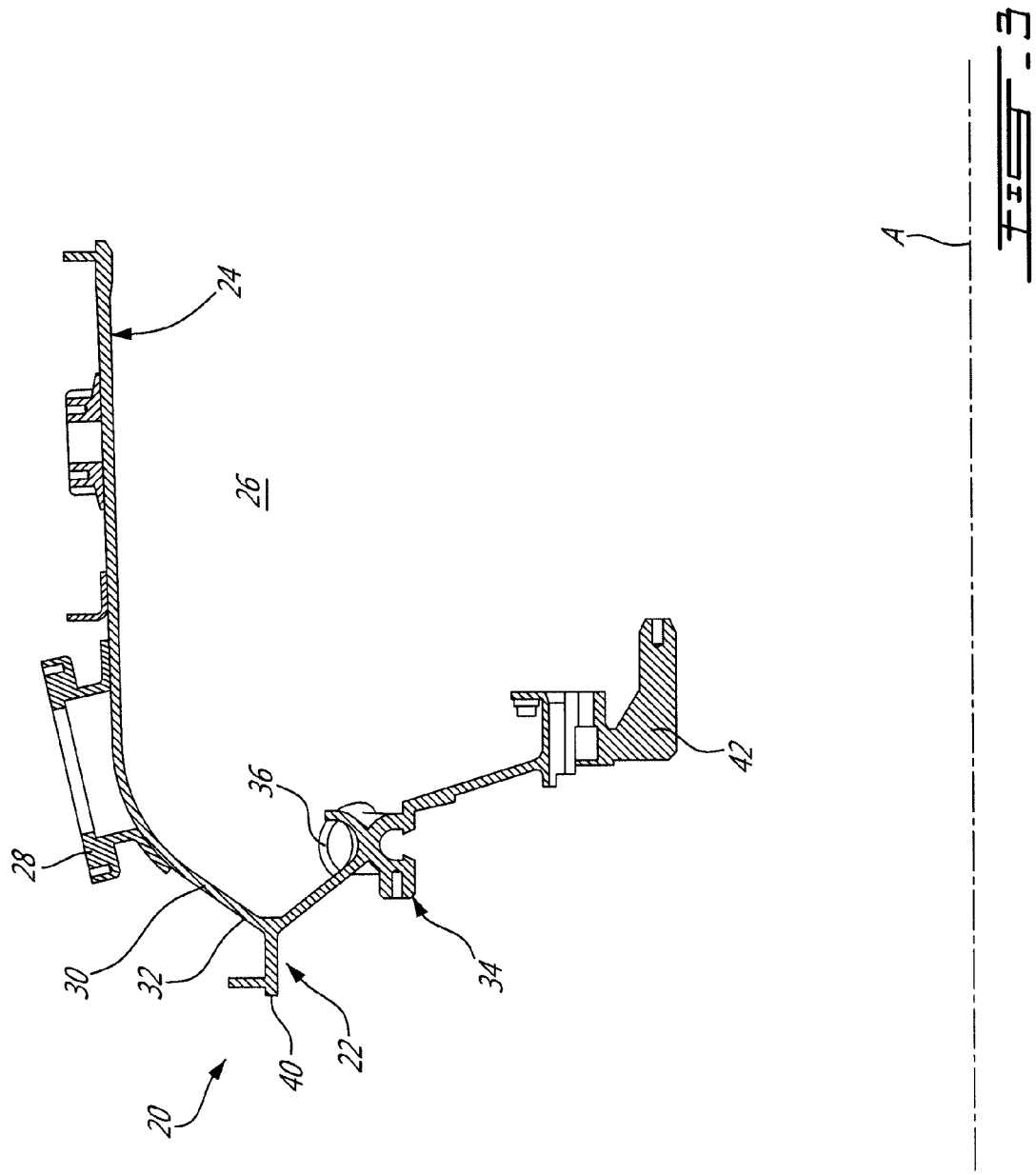
FIG. 3 is a schematic cross-sectional view of one side of the gas generator case of FIG. 2.

Referring particularly to FIGS. 2-3, the engine 10 includes a gas generator case 20 which surrounds and contains the combustor 16. The gas generator case 20 generally includes annular and concentric inner and outer portions 22, 24.

The outer portion 24 defines the outer wall of the combustor cavity 26 containing the combustor 16, and includes a port 28 for bleeding pressurized air from that cavity, for example for circulation into the cabin of the aircraft. The upstream end of the outer portion 24 is defined by an annular flange 30 (FIG. 2) extending at an angle from the axial direction A of the case. The inner portion 22 also includes an annular flange 32 (FIG. 2) in alignment with the annular flange 30 of the outer portion 24, both flanges 30, 32 being interconnected and defining the sole connection between the inner and outer portions 22, 24.

The inner portion 22 defines a diffuser 34 providing the fluid flow communication between the compressor section 14 and the combustor 16. The diffuser 34 includes angled tubes 36 which are circumferentially regularly spaced apart, and which are each connected to a respective curved diffuser pipe 38 (see FIG. 2), with the tubes 36 and pipes 38 being shaped to pressurize the accelerated flow exiting the compressor impellor. The diffuser 34 is approximately axially aligned with the connection flange 30 of the outer portion 24, and the inner portion 22 has an upstream end 40 protruding from the outer portion 24.

The inner portion 22 also defines a bearing housing 42 concentric to the diffuser 34. The bearing housing 42 is located radially inwardly and downstream of the diffuser 34, and receives a bearing supporting the high pressure shaft. The bearing housing 42 is contained within the outer portion 24. The inner portion 22 further includes oil passages 44, 45 in fluid communication with the bearing housing 42 and with an oil circulation system (not shown) of the engine 10, to provide an oil flow to and out of the bearing housing 42.

Figure 4:
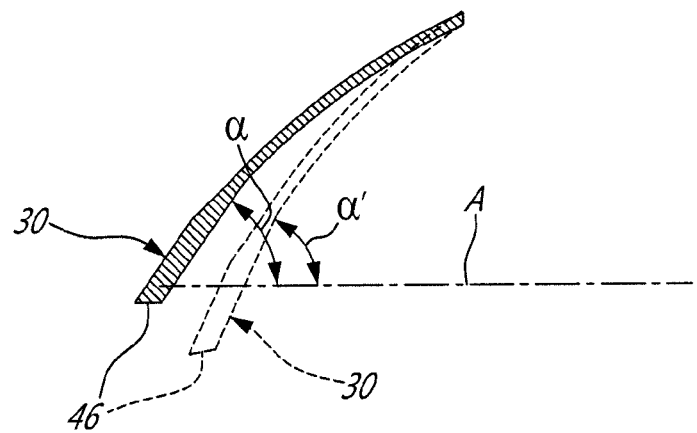
FIG. 4 is a schematic cross-sectional view of a connection flange of an outer portion of the gas generator case of FIG. 2, illustrating a deformation created during assembly of the gas generator case.

During initial manufacturing of the gas generator case 20, the inner and outer portions 22, 24 are moulded with excess material and are attached through welding of the connection flanges 30, 32. The connection flanges 30, 32 deform during the welding of the two portions 22, 24. This is illustrated by FIG. 4, where α is the blueprint acute angle between the connection flange 30 of the outer portion 24 and the axial direction A, or angle before initial assembly, and α' is the acute angle of the connection flange 30 once the gas generator case 20 is assembled, i.e. after welding during production. It can be seen that the value of the acute angle of the flange 30 with the axial direction A becomes larger after production welding, i.e. the end 46 of the flange 30 moves radially inwardly. After the inner and outer portions 22, 24 are connected, machining of various attachment flanges, holes and other features is performed starting from the center of the gas generator case 20 with a progression in which newly formed surfaces are used as datums to machine the next surfaces, resulting in a stacking of tolerances at the connection flanges 30, 32 which necessitates the relative position of the connection flanges 30, 32 to be within relatively tight tolerances. However, the deformation of the connection flanges 30, 32 during the initial assembly makes it difficult to replace only the inner portion 22 upon damage while remaining within required tolerances. For example, in a particular embodiment, a maximum offset of 0.02" is allowed between the connection flanges 30, 32 before attachment.

Accordingly, in the embodiment shown, when the inner portion 22 of the gas generator case 20 is damaged, the diffuser pipes 38 are removed, for example by cutting a ring (not shown) interconnecting each diffuser pipe 38 and its respective tube 36, and the outer and inner portions 22, 24 are separated by cutting the connected flanges 30, 32, preferably along or adjacent to the weld connection that was performed during initial manufacturing. The outer portion 24 is left with its connection flange 30 attached thereto, which is deformed such as shown in FIG. 4.

Figure 5:
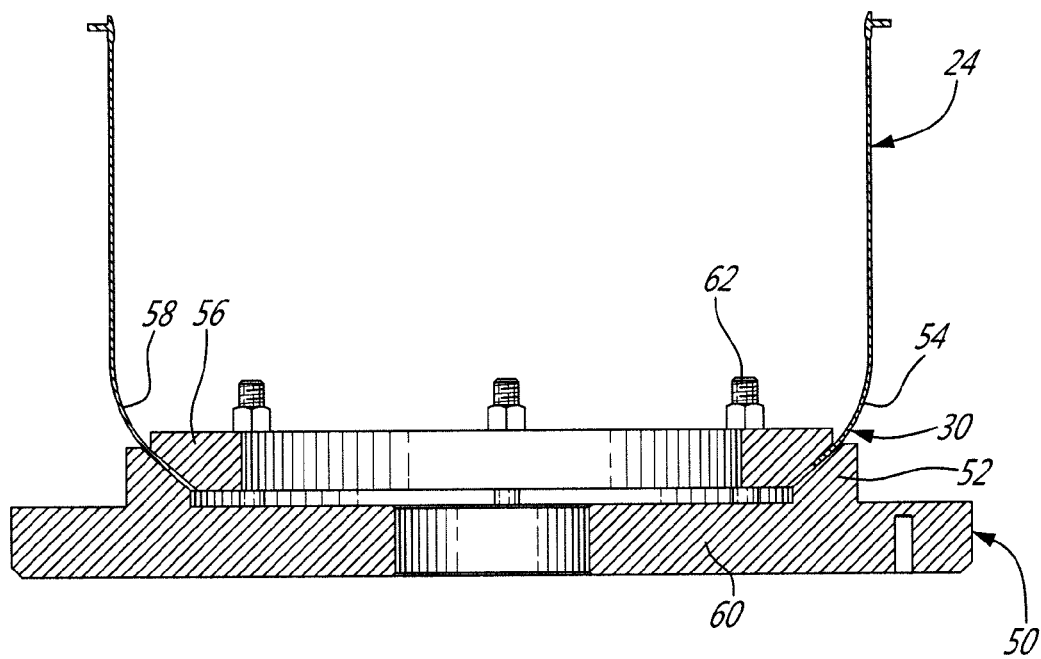
FIG. 5 is a schematic cross-sectional view of the outer portion of the gas generator case clamped in a fixture for reforming the connection flange.

Referring to FIGS. 5-6, the outer portion 24 is clamped in a fixture 50 to reform the connection flange 30. More particularly, the fixture 50 includes an annular outer element 52 conforming to the outer surface 54 of the connection flange 30 and an annular or circular inner element 56 conforming to the inner surface 58 of the connection flange 30. The outer and inner elements 52, 56 clamp the connection flange 30 between them. In the embodiment shown, this is done by having the outer and inner elements 52, 56 both connected to a same bottom plate 60 through respective fasteners 62; other configurations are also possible, for example a configuration where the outer and inner elements 52, 56 are directly interconnected. The outer and inner elements 52, 56 are shaped to force the connection flange 30 radially outwardly. In a particular embodiment, the outer and inner elements 52, 56 force the connection flange 30 to an angle which is smaller than the blueprint angle α; the connection flange 30 is thus placed in a position where the end 46 is moved further radially outwardly than the desired blueprint position.

In the embodiment shown, the connection flange 30 has a curved profile and as such the contacting surfaces of the outer and inner elements 52, 56 of the fixture 50 are correspondingly curved.

The clamped outer portion 24 is then heated to a temperature and for a time period corresponding to annealing of its material. The clamped outer portion 24 is then forced cooled at least up to a given temperature, after which it can be passively cooled. In a particular embodiment, the clamped outer portion 24 is heated under vacuum or partial pressure of argon. Once the outer portion 24 has reached a temperature at which it can be handled, it is removed from the fixture 50.

In a particular embodiment, the outer portion 24 is made of an austenitic nickel-chromium-based superalloy such as for example Inconel® 718, and the clamped outer portion 24 is heated to a temperature of 1750° F.±25° F. for about one hour, and then forced cooled at least until the temperature of the clamped portion 24 gets below 800° F.

The elements of the fixture 50 are made of a same material as that of the outer portion 24, in order to minimize the differences of heat expansion between the fixture 50 and outer portion 24.

In a particular embodiment, upon release from the fixture 50, the connection flange 30 relaxes and moves slightly radially inwardly, thus increasing its angle with the axial direction A. The angle of the connection flange 30 within the fixture 50 is selected such that after the reforming and release from the fixture 50, the connection flange 30 moves back to extend at or approximately at the blueprint angle α from the axial direction A.

The reformed outer portion 24 is then attached to a new inner portion 22 by attaching the reformed connection flange 30 to the connection flange 32 of the new inner portion 22. In a particular embodiment, the flange 32 of the new inner portion 22 and reformed connection flange 30 are attached using an Electron Beam (EB) welding process, which may provide weld shrinkage of approximately 0.015" with a variability of 0.003". The diffuser pipes 38, which in a particular embodiment are not replaced, are reattached to the respective diffuser tube 36 of the new inner portion using a new ring (not shown), for example by welding.

In a particular embodiment, the replacement of the inner portion 22 is performed when cracks are detected in the oil passages 44, 45 communicating with the bearing housing 42, which may lead to undesirable smoke in the cabin. The geometry of the oil passages 44, 45 may not allow the cracks to be successfully plugged or otherwise repaired, for example because of lack of accessibility and/or stresses in the repaired zone during use of the engine 10 which may lead to re-opening of the repaired cracks. Replacement of the inner portion 22 may provide for a less costly repair than the replacement of the complete gas generator case 20.

The above description is meant to be exemplary only, and one skilled in the art will recognize that changes may be made to the embodiments described without departing from the scope of the invention disclosed. For example, the inner portion may define only one of a diffuser and a bearing housing. Other modifications which fall within the scope of the present invention will be apparent to those skilled in the art, in light of a review of this disclosure, and such modifications are intended to fall within the appended claims.

The invention claimed is:

1. A method of repairing a gas generator case of a gas turbine engine, the case having an outer annular portion surrounding a damaged inner portion and having an annular flange at one end thereof defining a sole connection between the outer and inner portions, the annular flange extending at a first acute angle from an axial direction of the case, the method comprising:
  cutting between the annular flange and the inner portion along a circular path concentric with the flange;
  removing the damaged inner portion;
  clamping the outer portion in a fixture having an outer element conforming to an outer surface of the annular flange and an inner element conforming to an inner surface of the annular flange and pressing against the outer element, the fixture forcing the annular flange to a second acute angle from the axial direction smaller than the first angle, the fixture being made of a same material as that of the outer portion;
  heating the clamped outer portion to a temperature and time period corresponding to an annealing of the material of the outer portion;
  forcing cooling of the outer portion;
  removing the cooled outer portion from the fixture; and
  inserting a new inner portion within the outer portion and attaching the new inner portion to the flange.

2. The method as defined in claim 1, wherein after removing the cooled outer portion from the fixture, the flange extends at a third acute angle from the axial direction, the third angle being larger than the second angle and smaller than the first angle.

3. The method as defined in claim 1, wherein the third angle corresponds at least approximately to a blueprint angle of the flange.

4. The method as defined in claim 1, wherein attaching the new inner portion to the flange includes forming an EB weld between the new inner portion and the flange.

5. The method as defined in claim 1, wherein clamping the outer portion in the fixture includes conforming the outer element to a curved profile of the outer surface of the flange and conforming the inner element to a curved profile of the inner surface of the flange.

6. The method as defined in claim 1, wherein the material of the outer portion is an austenitic nickel-chromium-based superalloy, and heating the clamped outer portion includes heating to a temperature of from 1725° F. to 1775° F. for about one hour.

7. The method as defined in claim 1, wherein heating the clamped outer portion is performed under vacuum or partial pressure of argon.

8. The method as defined in claim 6, wherein forcing cooling of the heated clamped outer portion is performed until the outer portion has a temperature lower than 800° F., and before removing the outer portion of from the fixture, the method further comprising passively allowing the outer portion to cool from 800° F. to a handling temperature.

9. The method as defined in claim 1, wherein the inner portion includes a diffuser and a bearing housing, the method further comprising, before removing the damaged inner portion, detaching diffuser pipes from the damaged inner portion, and after inserting the new inner portion within the outer portion, attaching the diffuser pipes to the new inner portion.

10. A method of reforming an annular attachment flange at an extremity of an outer annular portion of a gas generator case of a gas turbine engine to a desired orientation for attachment to a remainder of the gas generator case, the method comprising:
  inserting a first fixture element within the annular portion made of a same material as that of the flange, the first fixture element conforming to an inner surface of the flange and forcing the flange radially outwardly passed the desired orientation;
  pressing the attachment flange against the first fixture element with a second annular fixture element made of a same material as that of the flange, surrounding the flange and conforming to an outer surface of the flange;
  heating the outer portion pressed by the fixture elements to a temperature and time period corresponding to an annealing of the material of the outer portion;
  forcing cooling of the outer portion; and
  disengaging the cooled outer portion from the fixture elements so that the released flange extends at the desired orientation.

11. The method as defined in claim 10, wherein the desired orientation corresponds at least approximately to a blueprint orientation of the flange.

12. The method as defined in claim 10, wherein inserting the first fixture element within the annular portion includes conforming the first fixture element to a curved profile of the inner surface, and pressing the attachment flange with the second annular fixture element includes conforming the second fixture element to a curved profile of the outer surface.

13. The method as defined in claim 10, wherein the material of the outer portion is an austenitic nickel-chromium-based superalloy, and heating the outer portion includes heating to a temperature of from 1725° F. to 1775° F. for about one hour.

14. The method as defined in claim 13, wherein forcing cooling of the outer portion is performed until the outer portion has a temperature lower than 800° F., and before disengaging the outer portion of from the fixture elements, the method further comprising passively allowing the outer portion to cool to a handling temperature.

15. The method as defined in claim 10, wherein heating the outer portion is performed under vacuum or partial pressure of argon.

16. A gas generator case comprising an outer portion reformed following the method defined in claim 10, the outer portion surrounding and being concentric to an inner portion defining a diffuser at an upstream end thereof, a bearing housing connected to the diffuser and located radially inwardly thereof and concentrically thereto, and an annular attachment flange extending downstream from the upstream end and located radially outwardly of and concentrically to the diffuser, the inner portion being in a unused state, the attachment flanges of the inner and outer portions being interconnected.

17. The gas generator case as defined in claim 16, wherein the attachment flanges of the inner and outer portions are interconnected by an EB weld joint.

18. The gas generator case as defined in claim 16, wherein the inner and outer portions are made of an austenitic nickel-chromium-based superalloy.

* * * * *